UNITED STATES PATENT OFFICE.

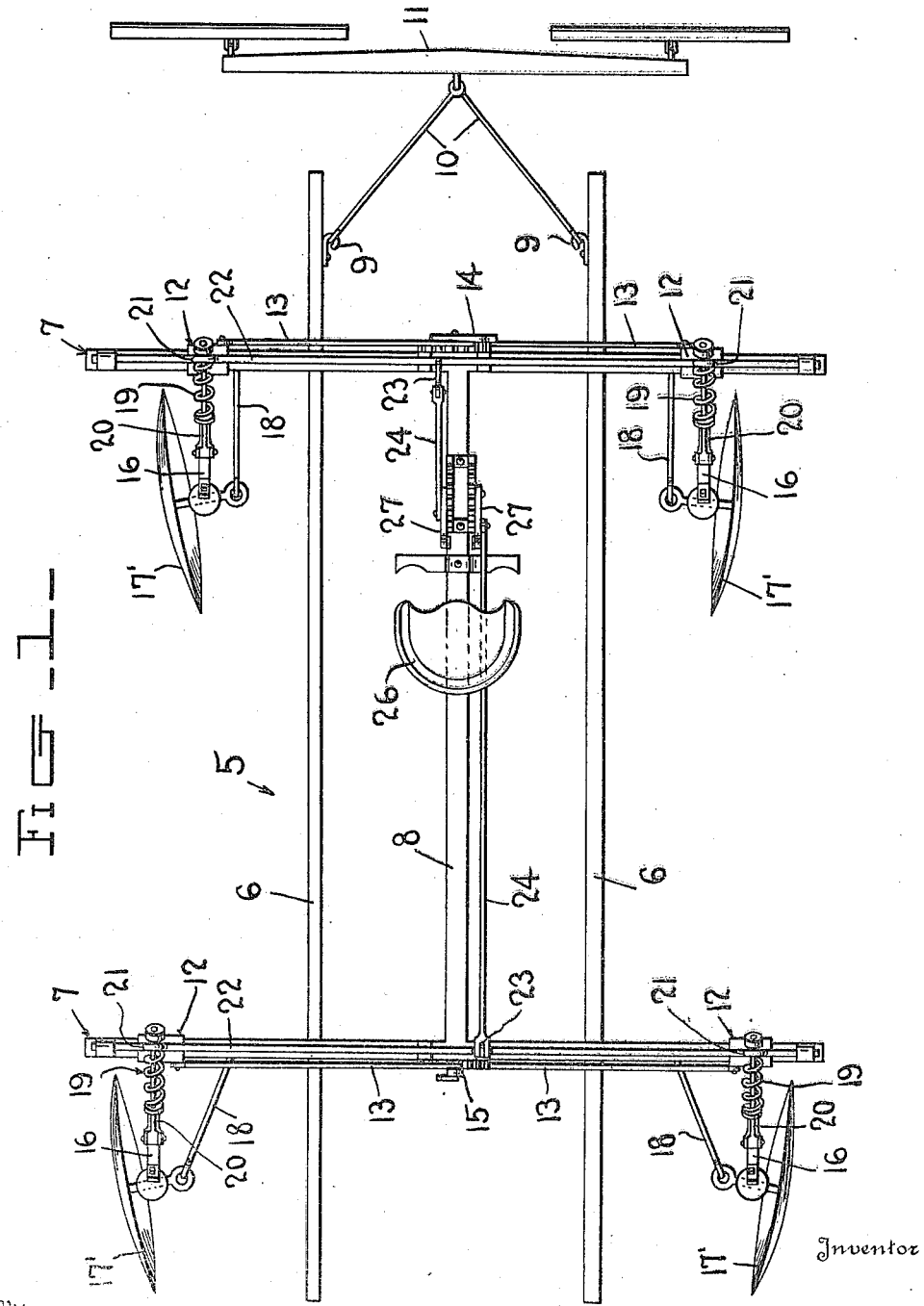

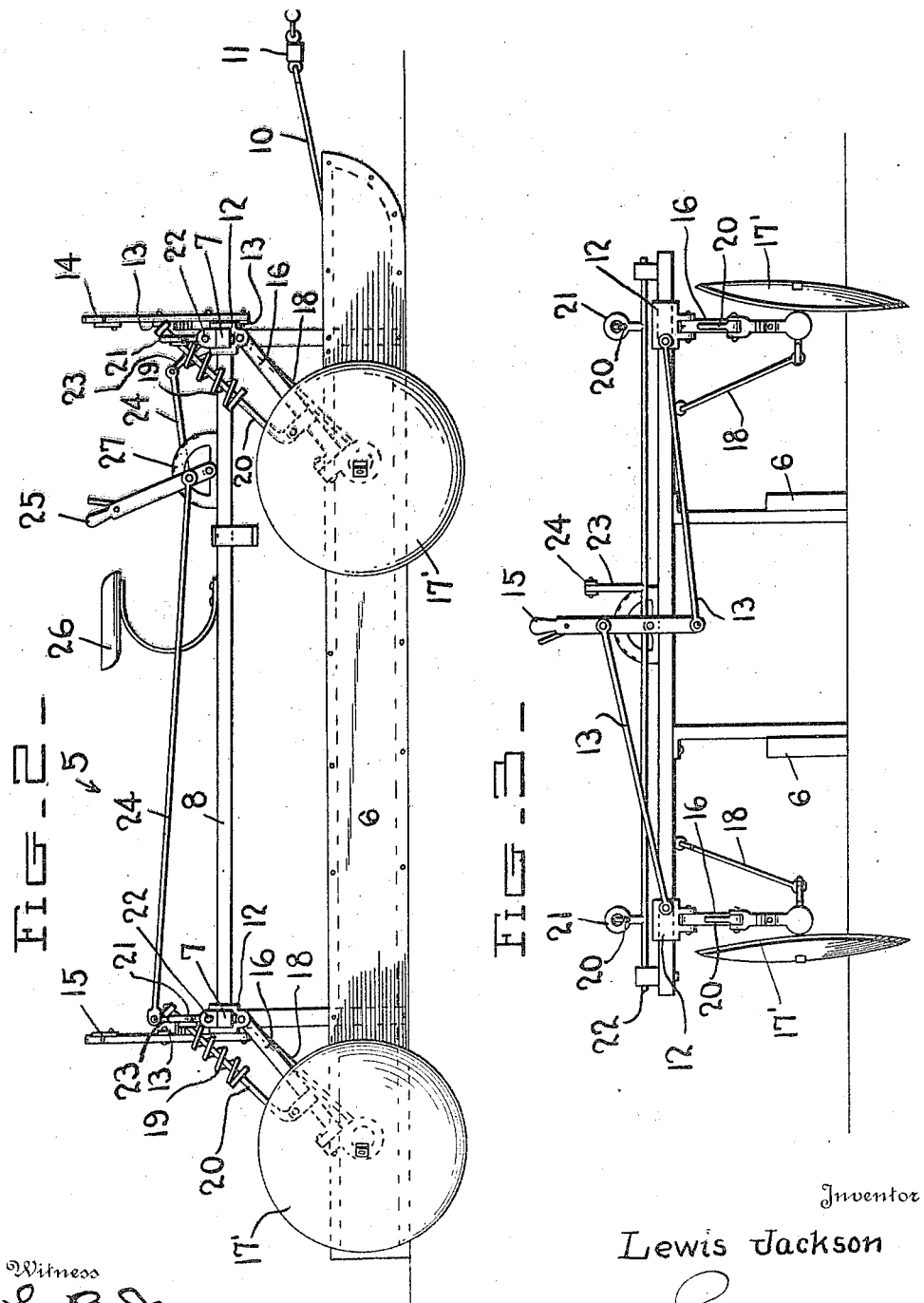

LEWIS JACKSON, OF SIMPSON, KANSAS.

AGRICULTURAL IMPLEMENT.

1,261,397. Specification of Letters Patent. Patented Apr. 2, 1918.

Application filed July 25, 1917. Serial No. 182,727.

*To all whom it may concern:*

Be it known that I, LEWIS JACKSON, a citizen of the United States, residing at Simpson, in the county of Mitchell and State of Kansas, have invented certain new and useful Improvements in Agricultural Implements, of which the following is a specification.

The present invention relates to new and useful improvements in agricultural implements.

The primary object of the invention is the provision of an agricultural implement applicable for use in connection with the cultivation of various crops.

Another object of the invention is the provision in a machine of this character of a pair of runners adjustable relative to each other and cultivating disks movable and adjustable with reference to said runners in both vertical and longitudinal planes.

A further object of the invention is the provision of a machine of the above specified type which can be combined with other similar machines for the purpose of cultivating several rows of crops.

A further object of the invention is the provision of a machine of the above specified type, which will be comparatively simple and inexpensive to manufacture, reliable and efficient in use, and readily operated.

With the above and other objects in view the present invention resides in the novel features of construction, formations, combinations and arrangements of parts to be hereinafter more particularly described, claimed and illustrated in the accompanying drawings forming a part of the present application, it being understood that various minor changes in the specific details of construction can be resorted to within the scope of the appended claims, without departing from the spirit or sacrificing any of the advantages of the invention.

In the accompanying drawings;

Figure 1 is a plan view of the invention;

Fig. 2 is a side elevation thereof; and

Fig. 3 is an end view thereof.

Referring to the accompanying drawings by corresponding characters of reference throughout the several views, the numeral 5 designates in general my improved agricultural implement, which consists of a pair of side runners 6 which are adjustably secured to the beams 7 which extend transversely and at the opposite ends of the end beam 8 to which the same are attached in any preferred manner.

These runners 6 may be moved to and from each other for the purpose of adjusting the distance there between. Hooks 9 are provided at the forward ends of the runners 6 to which are connected links 10 by means of which a suitable draft attachment 11 is connected to the forward end of the machine for the purpose of transporting the same from one locality to the other during its operation.

Castings 12 are slidably mounted upon the end beams 7 and have connected thereto links 13 which are in turn connected to the front and rear levers 14 and 15 upon the movement of which the castings 12 are slid transversely of the machine and longitudinally upon the said beams 7.

The arms 16 are pivoted to the castings 17 and have journaled thereon cultivating disks 17' which are moved transversely of the machine upon the movement of the before described castings 12.

These arms 16 are braced by suitable rods 18 and are forced normally and yield downward by the springs 19 which are positioned upon the rods 20 and engage at their upper ends the eyes 21 provided upon a rotary rod 22, one of which is positioned at either end of the machine. The rods 22 are also provided with up-standing arms 23 which are connected by links 24 to an opposite lever 25 mounted adjacent the operator's seat 26 and held in its adjusted positions by a pawl and ratchet locking device 27. Obviously as the lever 25 is pushed forwardly or drawn rearwardly of the machine the cultivating disks 17' will be raised and lowered so that the same will project the desired depth into the ground. The above machine is constructed for use in cultivating single rows of crops but two or more machines can be connected in any suitable manner side by side for the purpose of cultivating several rows of crops.

From the foregoing description it will be manifest that an agricultural implement is provided which will fulfil all of the necessary requirements of such a device.

Having thus fully described the invention what is claimed is:

1. In a machine such as described a pair of runners, a frame including end bars supported by the runners, castings slidable upon the end bars, means for moving the castings to and from each other, arms pivoted to the castings, disks journaled upon said arms, springs resiliently holding the arms in a predetermined position, a rod operatively connected to the springs, and means for rocking said rod and raising and lowering the arms.

2. In a machine of the character described, a frame including end bars, adjustable runners supporting said frame, castings slidable upon the frame, rocking rods at the ends of the frame, means for sliding the castings to and from each other, arms depending from the castings and movable to and from each other upon movement of the castings, disks journaled upon said arms, rods connecting the arm and frame, eyes provided upon the rocking rods, rods pivoted to the arms and passing through said eyes, springs surrounding said rods and normally forcing the arms downwardly, arms extending from the rocking rods, and means operatively connected to said arms for rocking the rods and raising and lowering the disks.

In testimony whereof I affix my signature in the presence of two witnesses.

LEWIS JACKSON.

Witnesses:
W. O. WAUGH,
C. D. JENNINGS.

Copies of this patent may be obtained for five cents each, by addressing the "Commissioner of Patents, Washington, D. C."